United States Patent Office 2,768,219
Patented Oct. 23, 1956

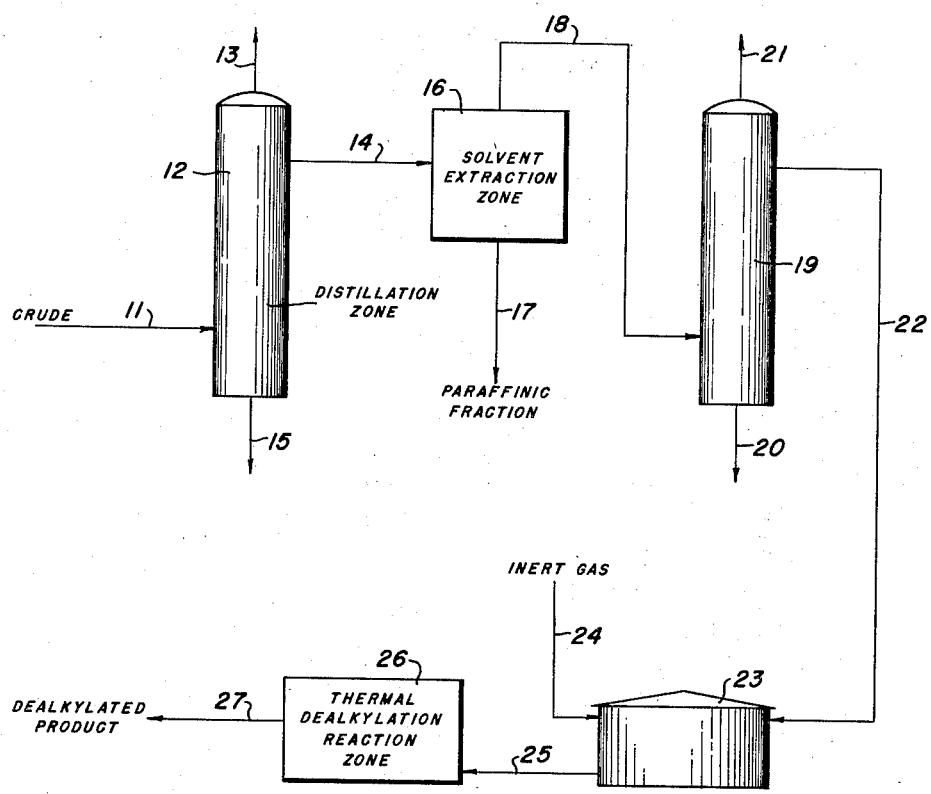

2,768,219

THERMAL DEALKYLATION OF AROMATIC HYDROCARBONS

Edward J. Hoffmann and Henry G. Schutze, Baytown, Tex., assignors, by mesne assignments, to Esso Research and Engineering Company, Elizabeth, N. J., a corporation of Delaware Application December 1, 1955, Serial No. 550,335

2 Claims. (Cl. 260—672)

The present invention is directed to a method of dealkylating substituted aromatic hydrocarbons.

The dealkylation of alkyl substituted aromatic hydrocarbons is a well known procedure in refinery operations. For example, methods for carrying out the dealkylation of alkyl substituted aromatic hydrocarbons are disclosed in U. S. patent application Serial No. 209,786, filed in the name of Edward J. Hoffmann on February 7, 1951, and U. S. patent application Serial No. 209,884, filed in the name of Sam R. Bethea on February 7, 1951. A convenient method for obtaining the desired aromatic hydrocarbon feed stock is by the treatment of crude petroleum by distillation and an aromatic separation process such as selective solvent extraction as with sulfur dioxide or phenol or by a percolation process involving a solid adsorbent such as alumina, silica gel, or activated carbon.

This application is a continuation-in-part of Serial No. 325,090 filed December 10, 1952, now abandoned, for Henry G. Schutze and Edward J. Hoffmann and entitled "Process for Dealkylating Aromatic Hydrocarbons."

The alkyl substituted aromatic hydrocarbon feed stock may then be passed to a reaction zone where the reaction temperature is within the range of 1100 to 1800° F. and the pressure is at least 400 p. s. i. g. and the reactants are maintained for at least one second in the presence of an excess of one molecule of hydrogen per atom of alkyl carbon in said substituted aromatic hydrocarbon. This reaction is the thermal dealkylation reaction described in Serial Nos. 209,786 and 209,884 mentioned supra. The resultant product contains an aromatic hydrocarbon having a lesser amount of carbon atoms than the original feed stock. In the conventional procedures considerable fouling consisting of ash, complex high boiling sulfur compounds and coke is encountered in the reaction chamber.

In the practice of the present invention, as stated, the reaction is a thermal reaction conducted in a reaction zone free from active catalyst. In short, the thermal reaction is conducted under the aforesaid temperature, pressure and time of contact conditions in the presence of a surface from which free metallic iron or other active metal catalyst is absent. The surface may be either a ceramic surface or it may be an alloy of steel such as one of the crome-nickel type of the 18-8 or 25-20 type. In other words, in the present invention, there is an absence of active catalytic material, either as contacting surfaces on the walls of the reaction zone or as materials which fill the reaction zone such that the reaction is one conducted under thermal conditions in a reaction zone free of active catalyst, metallic or otherwise.

In accordance with the present invention, the feed stock for a dealkylation reaction is treated in order to reduce or substantially eliminate the formation of undesirable deposits on the surfaces of the reaction zone in a dealkylation reaction. These deposits are eliminated by preparing a feed stock by removing organic peroxides, oxygen and metal-containing organic compounds therefrom and after such removal preventing the feed stock from coming into contact with oxygen until after it has been subjected to the dealkylation reaction zone.

A desirable method for carrying out the procedure of the present invention is to distill a crude petroleum to separate a fraction boiling within the range of 200 to 600° F. The aromatic portion of this fraction is then separated as by selective solvent extraction using a selective solvent such as sulfur dioxide or phenol. The resultant aromatic hydrocarbon fraction is then distilled while oxygen is carefully excluded from the distillation step as well as the subsequent condensation step whereby oil soluble metal-containing organic compounds which may be formed during the solvent extraction step as well as peroxides and inorganic materials remain as bottoms and any oxygen is taken off as overhead. The desired aromatic fraction is carefully kept from coming into contact with oxygen during subsequent storage as by maintaining an atmosphere of natural gas or some inert gas as long as it remains in storage. The feed stock is then passed to a thermal dealkylation zone free from active catalyst where dealkylation of at least a substantial portion of the substituted aromatic hydrocarbons present in the feed stock takes place.

A preferred method for carrying out the present invention will now be described in conjunction with the drawing in which the figure is in the form of a diagrammatic flow sheet.

Turning now specifically to the drawing, a crude petroleum is discharged through inlet line 11 to distillation zone 12 where several fractions are separated. For convenience, an overhead fraction is shown as removed through line 13. A side stream fraction boiling within the range of 200 to 600° F. is removed through line 14 and a bottoms fraction is removed through line 15. The side stream fraction from line 14 is discharged to a solvent extraction step indicated diagrammatically by rectangle 16. In the solvent extraction step, a paraffinic fraction is separated and is removed through line 17 and an aromatic fraction is separated and removed through line 18. Aromatic fraction 18 may contain water soluble metallic compounds resulting from contact with the sulfur dioxide or phenol commonly used as the selective solvent in the solvent extraction step. Examples of such metal-containing organic compounds are salts of sodium with mercaptans and other sulfur compounds and metallic salts of phenol. The aromatic fraction in line 18 may also contain peroxides which have resulted from the contact of oxygen with compounds present in the oil, such as olefins. Dissolved oxygen may also be present in the aromatic fraction. In order to prepare a feed stock which will allow the dealkylation reaction to be carried out while eliminating the fouling of surfaces in the reaction zone, the fraction in line 18 is passed to distillation zone 19 where it is distilled into a bottoms containing peroxides and organic compounds containing various metal salts and complexes which are removed through line 20, an overhead fraction containing light hydrocarbons as well as oxygen which is removed through line 21 and a side stream free from oxygen which is removed through line 22. The aromatic feed stock in line 22 is carefully kept from contact with oxygen. This is illustrated in the drawing by showing the fraction as passed into storage tank 23 to which inert gas is supplied through inlet line 24 to provide continuously an atmosphere of oxygen free gas in the storage tank. The aromatic feed stock is removed from storage tank 23 through line 25 and discharged to thermal reaction zone 26 where dealkylation of at least a substantial portion of the alkylated feed stock takes place. Product is removed from the alkylation reaction zone 26 through line 27.

To illustrate further the present invention, the following examples are given. In the first example the prior art procedure is represented and in the second example the present invention is represented.

In each case the feed stock had a boiling point within the range of 230° to 600° F. and was obtained by the solvent extraction with sulfur dioxide of a suitable petroleum fraction. The equipment employed consisted of preheat and reaction coils and the reaction conditions were 1300° F., 600 pounds per square inch, 10 seconds residence time and 5000 cubic feet of hydrogen per barrel of feed.

*Example I*

The feed stock was washed with water to remove water soluble sodium compounds present as a result of using sodium hydroxide solution to neutralize residual sulfur dioxide from a solvent extraction zone and contained .0014 weight percent ash and an undetermined amount of complex high boiling sulfur compounds. The unit was operated until deposits were found in the preheat and reaction coils to such an extent as to cause a pressure drop of 50 pounds per square inch across the coils. The average of several runs was approximately 7 hours operating time with considerable deposits occurring particularly in the preheat and initial portions of the reaction coils.

*Example II*

In this example the feed was distilled in the absence of oxygen to 0–96% overhead fraction and thereafter stored in an oxygen free atmosphere before charging to the reaction unit. This material was completely free of ash. Upon charging this material to the dealkylation reaction zone, it was found that the deposits within the zone were much less than in the preceding Example I. Whereas the deposits in the preheat and initial portions of the reaction coils caused a pressure drop of 50 pounds per square inch to occur within an average time of 7 hours in Example I, in the present example the reaction proceeded for an average time of approximately 24 hours before the deposits caused a pressure drop of 50 pounds per square inch across said reaction coils.

While we have disclosed a specific example illustrating the practice of the present invention, it is to be understood that this example is by way of illustration only, and is not intended to limit the scope of the invention.

Having fully described and illustrated the practice of the present invention, what we desire to claim is:

1. In the thermal dealkylation of an alkyl substituted aromatic hydrocarbon feed stock having a boiling point in the range of 200° to 600° F. by reacting the feed stock in a reaction zone free from active catalyst at a temperature in the range of 1100° to 1800° F. and at a pressure of at least 400 p. s. i. g. For at least one second in the presence of an excess of one molecule of hydrogen per atom of alkyl carbon in a substituted aromatic hydrocarbon, the steps of treating an alkyl substituted aromatic hydrocarbon feed stock containing peroxides, oxygen, and ash by removing from said aromatic hydrocarbon any peroxides, oxygen, and ash contained therein and thereafter excluding oxygen from any atmosphere with which said feed stock may come into contact until it is charged to said reaction zone.

2. A method for treating a hydrocarbon fraction containing alkyl substituted aromatic hydrocarbons boiling in the range of 200° to 600° F. including the steps of solvent extracting said hydrocarbons to obtain a substituted aromatic hydrocarbon fraction having a boiling point in the range from 200 to 600° F. and contaminated with metallic compounds and peroxides, fractionating said substituted aromatic fraction while excluding oxygen from coming in contact therewith to obtain a distillate fraction, substantially free from said metallic compounds and peroxides, blanketing said distillate fraction with inert gas and thereafter charging said distillate fraction as a feed stock to a thermal reaction zone free from active catalyst where it is subjected to reaction conditions at a temperature within the range of 1100° F. to 1800° F. for at least one second and at a pressure of at least 400 p. s. i. g. in the presence of excess of one molecule of hydrogen per atom of alkyl carbon in said substituted aromatic hydrocarbon without allowing said feed stock to come into contact with oxygen to form a product containing an aromatic hydrocarbon having a lesser number of carbon atoms than said alkyl substituted aromatic fraction hydrocarbon.

References Cited in the file of this patent

UNITED STATES PATENTS

| | | |
|---|---|---|
| 2,007,114 | Stratford | July 2, 1935 |
| 2,322,673 | Sweeney | June 22, 1943 |
| 2,349,211 | Tulleners | May 16, 1944 |
| 2,380,279 | Welty | July 10, 1945 |
| 2,395,161 | Ashmore et al. | Feb. 19, 1946 |
| 2,417,280 | Viles | Mar. 11, 1947 |
| 2,425,532 | Hemminger | Aug. 12, 1947 |